(12) United States Patent
Lu et al.

(10) Patent No.: US 10,331,234 B2
(45) Date of Patent: Jun. 25, 2019

(54) COMPUTER MOUSE HAVING INTERCHANGEABLE MODULES ADAPTABLE TO LEFT/RIGHT HAND USE

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Yi-Shun Chen, New Taipei (TW); Ching-Tsun Hong, New Taipei (TW)

(73) Assignees: DEXIN ELECTRIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/265,381

(22) Filed: Feb. 1, 2019

(65) Prior Publication Data

US 2019/0163290 A1 May 30, 2019

Related U.S. Application Data

(63) Continuation-in-part of application No. 14/850,170, filed on Sep. 10, 2015, now abandoned.

(51) Int. Cl.
*G06F 3/0354* (2013.01)
*H01H 13/7057* (2006.01)
*G06F 3/02* (2006.01)

(52) U.S. Cl.
CPC ........ *G06F 3/03543* (2013.01); *G06F 3/0202* (2013.01); *H01H 13/7057* (2013.01); *G06F 2203/0332* (2013.01)

(58) Field of Classification Search
None
See application file for complete search history.

(56) References Cited

U.S. PATENT DOCUMENTS

2006/0044270 A1* 3/2006 Chen ................... G06F 3/03543
345/163
2015/0109208 A1* 4/2015 Wang .................. G06F 3/03543
345/163

* cited by examiner

*Primary Examiner* — Christopher J Kohlman
(74) *Attorney, Agent, or Firm* — Li & Cai Intellectual Property (USA) Office

(57) ABSTRACT

A computer mouse includes a mouse body, a first input unit, and a second input unit. The mouse body includes a first joint portion and a second joint portion, and the first joint portion and the second joint portion are symmetrically arranged with respect to one another. The first input unit includes a first base and a first button disposed on the first base. The second input unit includes a second base and a second button disposed on the second base. The shape of the first base is corresponding to that of the first joint portion and the shape of the second base is corresponding to that of the second joint portion such that the first input unit and the second input unit are interchangeably respectively disposed on the first joint portion and the second joint.

11 Claims, 6 Drawing Sheets

COMPUTER MOUSE HAVING INTERCHANGEABLE MODULES ADAPTABLE TO LEFT/RIGHT HAND USE

CROSS-REFERENCE TO RELATED PATENT APPLICATION

This Application is a Continuation-in-Part of application Ser. No. 14/850,170 filed Sep. 10, 2015, now pending, and entitled computer mouse having interchangeable modules adaptable to left/right hand use.

BACKGROUND

1. Field of the Invention

The instant disclosure relates to a computer mouse; in particular, to a computer mouse having interchangeable modules adaptable to left/right hand use.

2. Description of Related Art

As technology advances, personal computers, laptops or tablets in all shapes and sizes have become an essential tool for both work and entertainment. The computer mouse is a common input device for electronic devices. Most computer mice have generally symmetrical sides for the right or the left hand. Some computer mice are specially shaped for the right-handed users or the left-handed users only. However, the abovementioned computer mice have a predetermined specification at manufacture and do not always meet each individual's specific needs.

To address the above issues, the inventor strives via associated experience and research to present the instant disclosure, which can effectively improve the limitation described above.

BRIEF SUMMARY OF THE INVENTION

The instant disclosure provides a computer mouse having interchangeable modules adaptable to left/right hand use. The modules can be simply replaced according to different requirements.

According to one exemplary embodiment of the instant disclosure, the computer mouse includes a mouse body, a first input unit, and a second input unit. The mouse body includes a first joint portion and a second joint portion, and the first joint portion and the second joint portion are symmetrically arranged with respect to one another. The first input unit includes a first base and a first button disposed on the first base. The second input unit includes a second base and a second button disposed on the second base. The shape of the first base is corresponding to that of the first joint portion and the shape of the second base is corresponding to that of the second joint portion such that the first input unit and the second input unit are interchangeably respectively disposed on the first joint portion and the second joint portion.

In summary, the computer mouse of the present disclosure through the first joint portion and the second joint portion are symmetrically arranged with respect to one another, and the shape of the first base is corresponding to that of the first joint portion and the shape of the second base is corresponding to that of the second joint portion, such that the first input unit and the second input unit are interchangeably respectively disposed on the first joint portion and the second joint portion. Thereby simply interchanging the first input units or the second input units meets different needs of the user.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
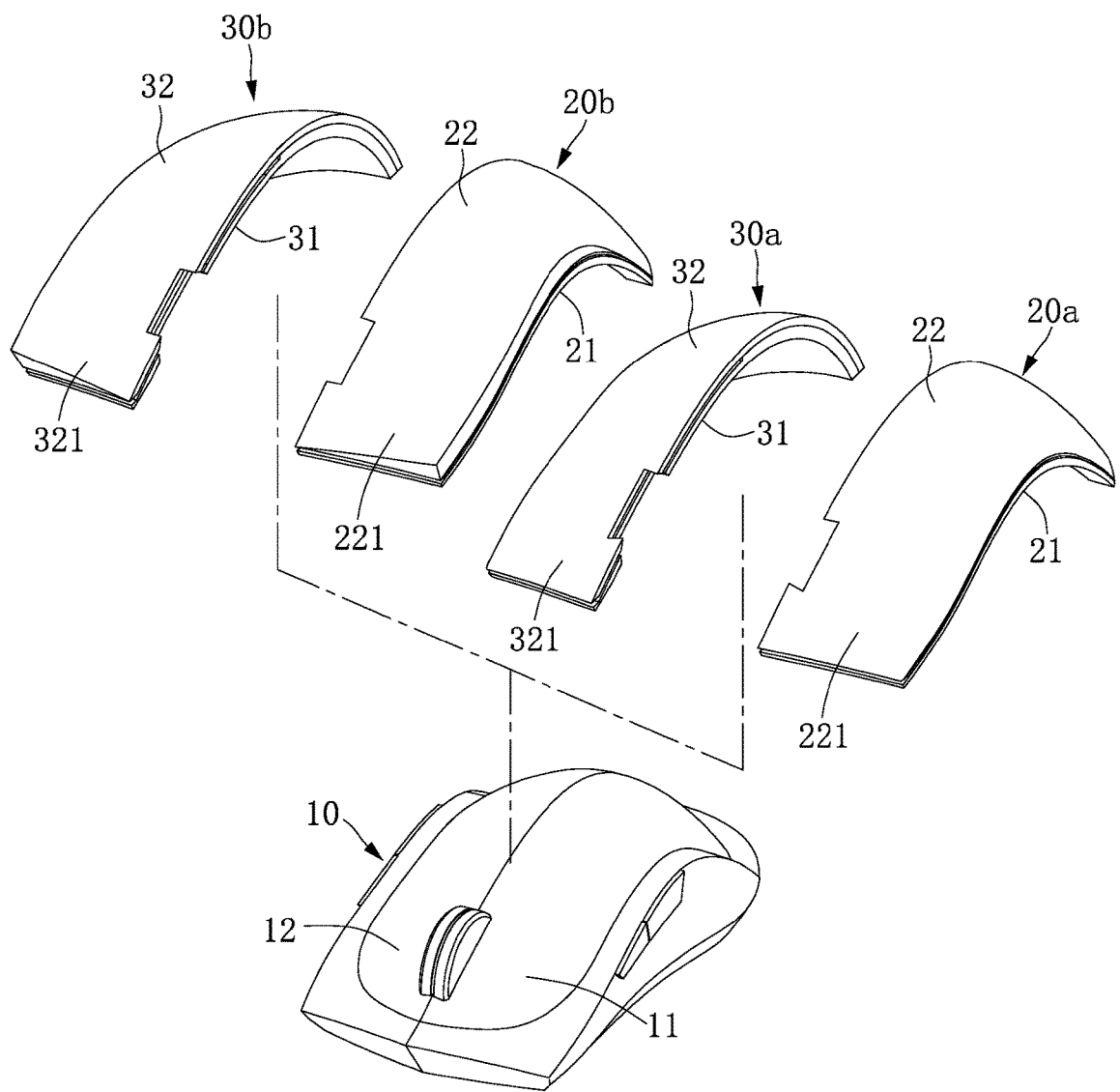
FIG. 1 is a perspective exploded view of a computer mouse of an exemplary embodiment of the present invention.

Referring to FIG. 1 showing an exemplary embodiment of the present disclosure, the present disclosure provides a computer mouse having interchangeable modules adaptable to left/right hand use. The computer mouse includes a mouse body 10, two interchangeable first input units 20*a*, 20*b*, and two interchangeable second input units 30*a*, 30*b*. The following describes the mouse body 10, the first input units 20*a*, 20*b*, and the second input units 30*a*, 30*b*, and then the connection relationships there-between.

First Alternative Embodiment

Figure 2:
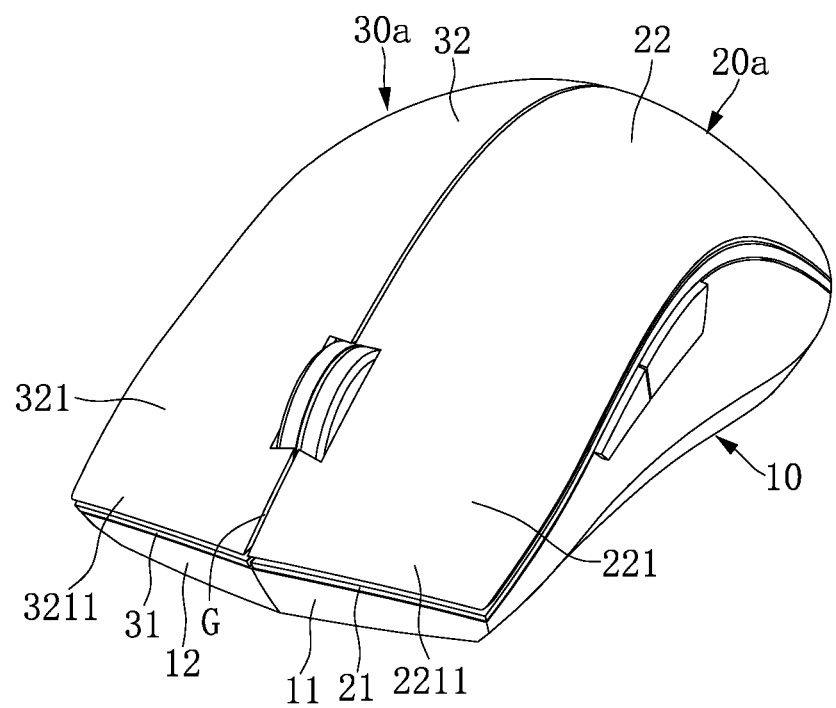
FIG. 2 is a perspective view of a computer mouse of a first alternative embodiment of the present invention.
Figure 3:
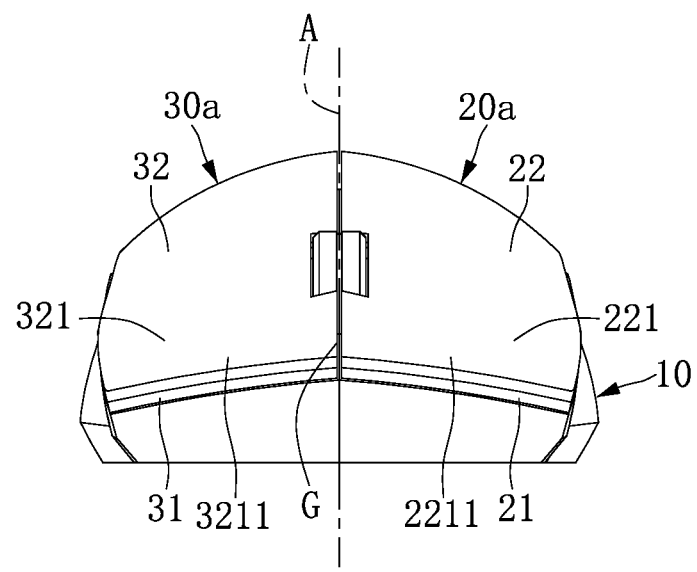
FIG. 3 is a front elevation view of a computer mouse of a first alternative embodiment of the present invention.

Please refer to FIGS. 2 to 3, in conjunction with FIG. 1. As shown in FIG. 1, the mouse body 10 includes a first joint portion 11 and a second joint portion 12. The first joint portion 11 and the second joint portion 12 are symmetrically arranged with respect to one another. In the instant embodiment, the first joint portion 11 is the left portion of the mouse body 10, and the second joint portion 12 is the right portion of the mouse body 10. In another embodiment, the first joint portion 11 can be the right portion of the mouse body 10, and the second joint portion 12 can be the left portion of the mouse body 10. It should be noted that the mouse body 10 includes other elements, for example, roller, controller, switches, sensor, battery, and the conventional composition of a computer mouse is not elaborated herein.

The first input unit 20a and the second input unit 30a are used for performing input operation. The first input unit 20a and the second input unit 30a respectively have an arch shape. The first input unit 20a includes a first base 21 and a first button 22 disposed on the first base 21, and the second input unit 30a includes a second base 31 and a second button 32 disposed on the second base 31. The shape of the first base 21 is corresponding to that of the first joint portion 11, and the shape of the second base 31 is corresponding to that of the second joint portion 12, such that the first input unit 20a and the second input unit 30a are interchangeably respectively disposed on the first joint portion 11 and the second joint portion 12 by magnetic attraction, engagement, or some other similar fashion. In the instant embodiment, the first button 22 is a left button which can be depressed downwardly relative to the first base 21 in order to generate click signals in response to click operations. Similar to before, the second button 32 is a right button which can be depressed downwardly relative to the second base 31 in order to generate click signals in response to click operations. In another embodiment, the first button 22 can be a right button, and the second button 32 can be a left button. In addition, the function of the first button 22 and second button 32 can be exchanged by a function-exchange button disposed on the mouse body 10.

The first input unit 20a and the second input unit 30a are detachable, such that the first input unit 20a and the second input unit 30a can be detachably respectively disposed on the first joint portion 11 and the second joint portion 12. Moreover, the first input unit 20a and the second input unit 30a are symmetrically arranged, such that the first input unit 20a and the second input unit 30a are symmetrically respectively disposed on the first joint portion 11 and the second joint portion 12 relative to the central axis A of the mouse body 11.

In more detail, the front end of the first button 22 has a first pressing section 221, and the front end of the second button 32 has a second pressing section 321. The inner edge of the first pressing section 221 and the inner edge of the second pressing section 321 cooperatively define a gap G there-between. The first pressing section 221 has a first curved surface 2211 curved downwardly from the inner edge of the first pressing section 221 to the outer edge of the first pressing section 221, and the second pressing section 321 has a second curved surface 3211 curved downwardly from the inner edge of the second pressing section 321 to the outer edge of the second pressing section 321, such that the first curved surface 221 and the second curved surface 321 are configured to be symmetrically curved with respect to one another. Thereby, when using the computer mouse with the right hand, the height of the right index finger placed on the first pressing section 221 is substantially equal to that of the right middle finger placed on the second pressing section 321 so as to give the right-handed user a balanced feeling upon use. Likewise, when using the computer mouse with the left hand, the height of the left index finger placed on the second pressing section 321 is substantially equal to that of the left middle finger placed on the first pressing section 221 so as to give the left-handed user a balanced feeling upon use.

Second Alternative Embodiment

Figure 4:
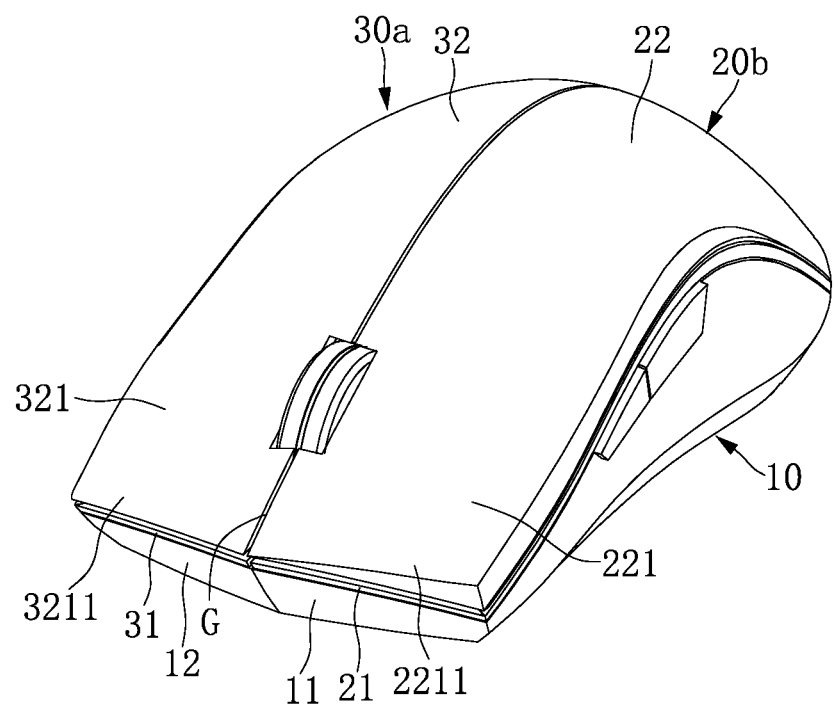
FIG. 4 is a perspective view of a computer mouse of a second alternative embodiment of the present invention.
Figure 5:
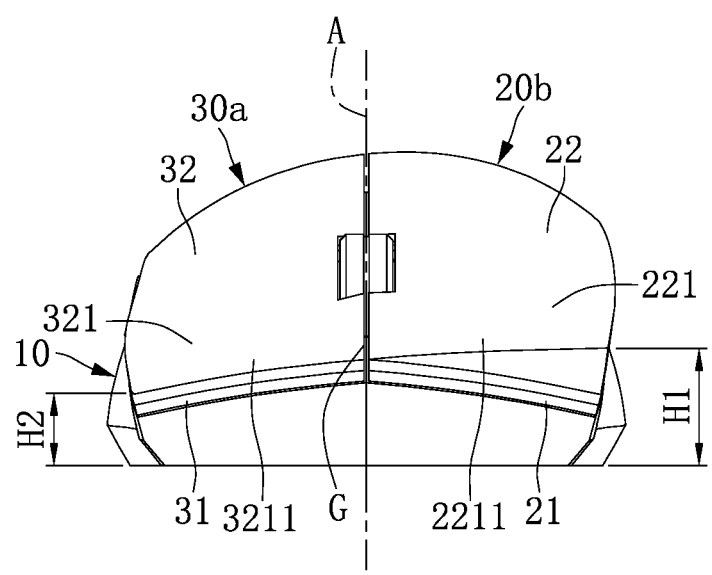
FIG. 5 is a front elevation view of a computer mouse of a second alternative embodiment of the present invention.

Please refer to FIGS. 4 to 5, in conjunction with FIG. 1. The structure of the present embodiment is similar to that of the first alternative embodiment described above, so that the same reference numbers used in the previous drawing will be used to refer to the same or like parts. The main difference between the present embodiment and the first alternative embodiment is that the first input unit 20b and the second input unit 30a are asymmetrically arranged, such that the first input unit 20b and the second input unit 30a are asymmetrically respectively disposed on the first joint portion 11 and the second joint portion 12 relative to the central axis A of the mouse body 11.

In more detail, the first pressing section 221 of the first input unit 20b has a first curved surface 2211 curved upwardly from the inner edge of the first pressing section 221 to the outer edge of the first pressing section 221, and the second pressing section 321 of the second input unit 30a has a second curved surface 3211 curved downwardly from the inner edge of the second pressing section 321 to the outer edge of the second pressing section 321, such that the first curved surface 2211 and the second curved surface 3211 are configured to be asymmetrically curved with respect to one another. In other words, the first curved surface 2211 gradually decreases in height from the outer edge of the first pressing section 221 to the inner edge of the first pressing section 221, and the second curved surface 3211 gradually decreases in height from the inner edge of the second pressing section 321 to the outer edge of the first pressing section 321, such that the height H1 of first pressing section 221 is greater than the height H2 of second pressing section 321. Thereby, when using the computer mouse with the right hand, the height of the right index finger placed on the first pressing section 221 is naturally higher than that of the right middle finger placed on the second pressing section 321 so as to give the right-handed user a comfortable and ergonomic feeling upon use by simply interchanging the first input units 20a, 20b.

Third Alternative Embodiment

Figure 6:
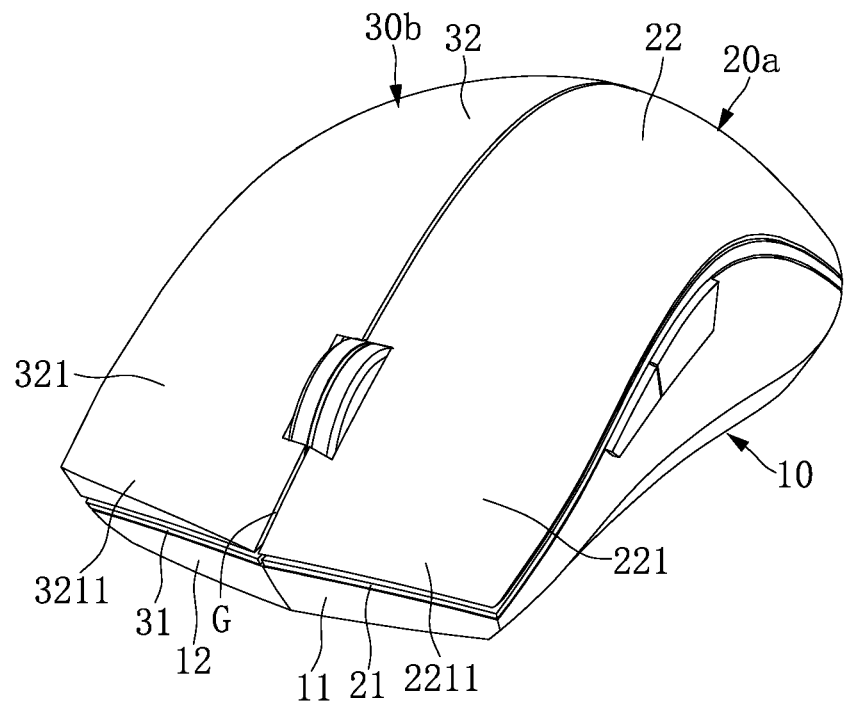
FIG. 6 is a perspective view of a computer mouse of a third alternative embodiment of the present invention.
Figure 7:
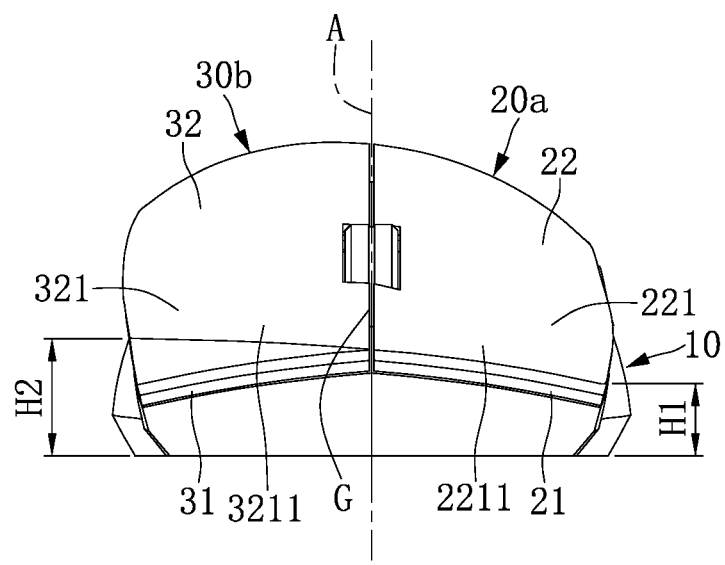
FIG. 7 is a front elevation view of a computer mouse of a third alternative embodiment of the present invention.

Please refer to FIGS. 6 to 7, in conjunction with FIG. 1. The structure of the present embodiment is similar to that of the first alternative embodiment described above, so that the same reference numbers used in the previous drawing will be used to refer to the same or like parts. The main difference between the present embodiment and the first alternative embodiment is that the first input unit 20a and the second input unit 30b are asymmetrically arranged, such that the first input unit 20a and the second input unit 30b are asymmetrically respectively disposed on the first joint portion 11 and the second joint portion 12 relative to the central axis A of the mouse body 11.

In more detail, the first pressing section 221 of the first input unit 20a has the first curved surface 2211 curved downwardly from the inner edge of the first pressing section 221 to the outer edge of the first pressing section 221, and the second pressing section 321 of the second input unit 30b has a second curved surface 3211 curved upwardly from the inner edge of the second pressing section 321 to the outer edge of the second pressing section 321, such that the first curved surface 221 and the second curved surface 321 are configured to be asymmetrically curved with respect to one another. In other words, the second curved surface 3211 gradually decreases in height from the outer edge of the second pressing section 321 to the inner edge of the second pressing section 321, and the first curved surface 2211 gradually decreases in height from the inner edge of the first pressing section 221 to the outer edge of the first pressing section 221, such that the height H2 of the second pressing section 321 is greater than the height H1 of the first pressing section 221. Thereby, when using the computer mouse with the left hand, the height of the left index finger placed on the second pressing section 321 is naturally higher than that of the left middle finger placed on the first pressing section 221 so as to give the left-handed user a comfortable and ergonomic feeling upon use by simply interchanging the second input units 30a, 30b.

Figure 8:
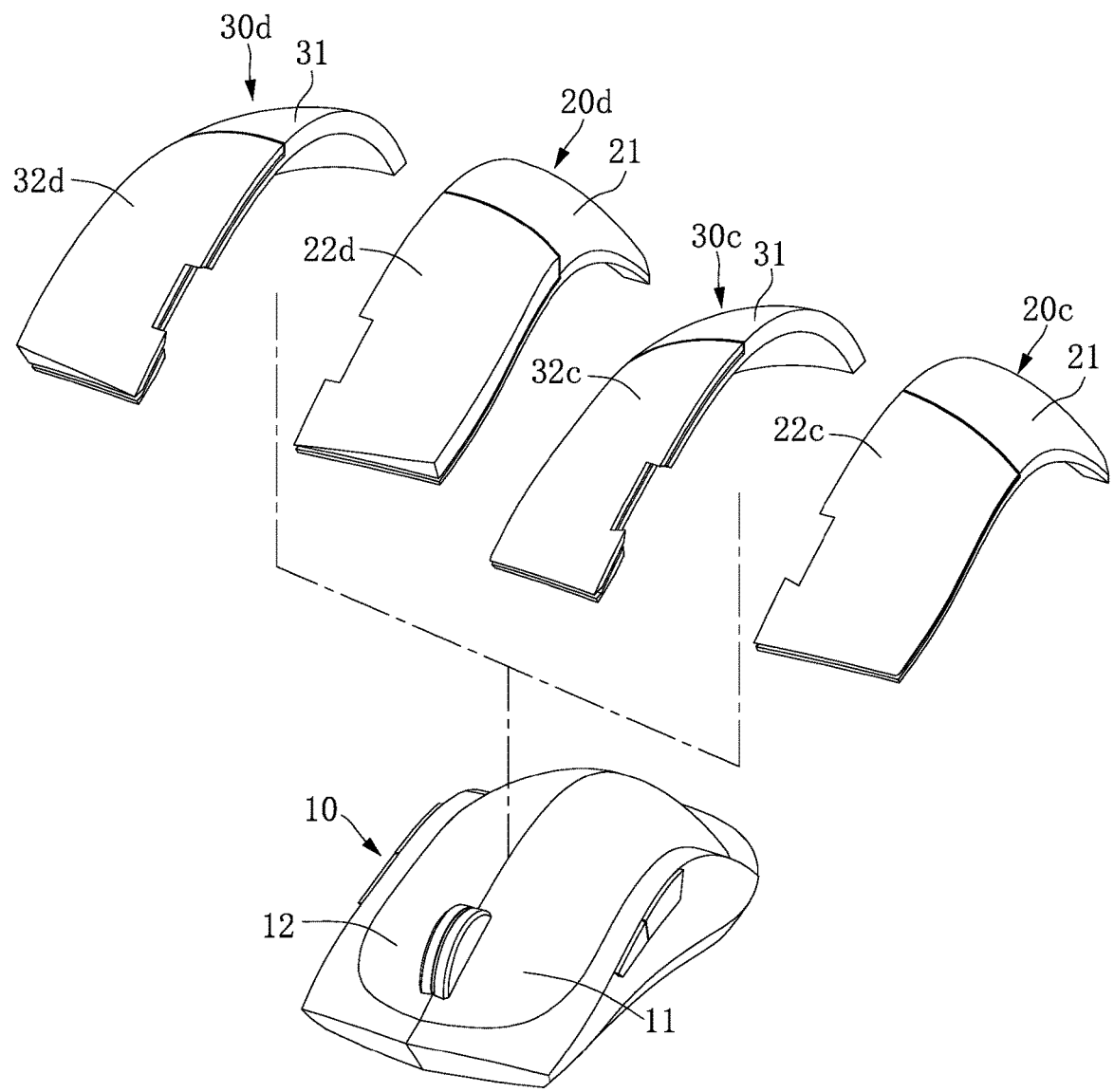
FIG. 8 is a perspective exploded view of a computer mouse of another exemplary embodiment of the present invention.

In another embodiment, as shown in FIG. 8, the first buttons 22c, 22d and the second buttons 32c, 32d are detachable. When the first base 21 and the second base 31 are respectively disposed on the first joint portion 11 and the second joint portion 12, and the first button 22c and the second button 32c are detachably respectively disposed on the first base 21 and second base 31, the computer mouse forms a symmetrical shape, so that it can be used with either the right hand or the left hand. When the first button 22c is interchanged with the other first button 22d, the computer mouse forms an asymmetrical shape, so that it can be adapted for a right-handed user only. When the second button 32c is interchanged with the other second button 32d, the mouse forms an asymmetrical shape, so that it can be adapted for a left-handed user only. Therefore, the buttons can be interchanged to meet various needs.

Figure 9:
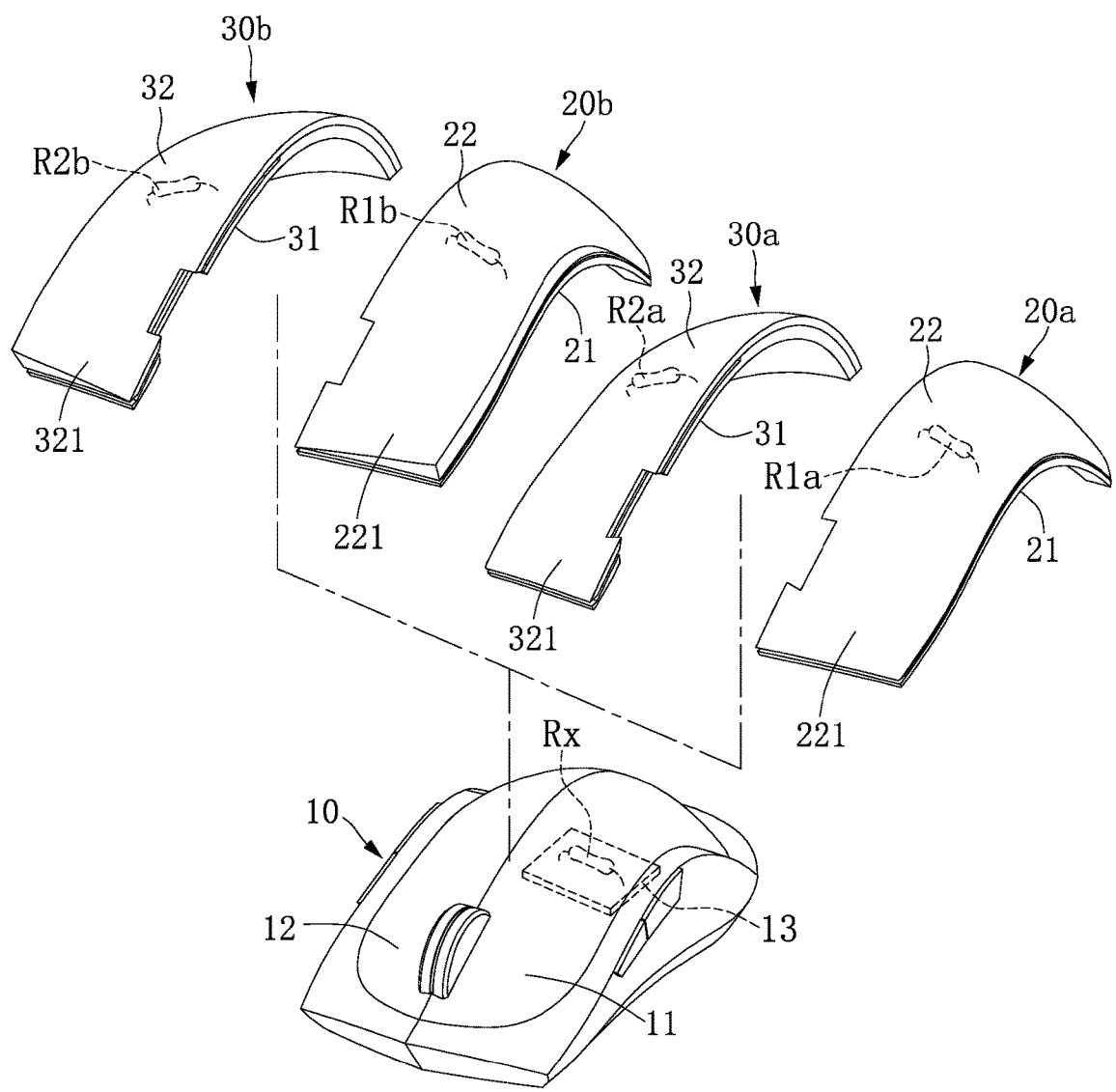
FIG. 9 is a perspective exploded view of a computer mouse of yet another exemplary embodiment of the present invention.

In yet another embodiment, as shown in FIG. 9, the mouse body 10 includes a processing unit 13 disposed therein. Moreover, the processing unit 11 has a main resistor Rx. The first input units 20a, 20b have first divider resistors R1a, R1b, respectively, and the second input units 30a, 30b have second divider resistors R2a, R2b, respectively. Resistance values of the first divider resistor R1a and the second divider resistor R2a are the same. A resistance value of the first divider resistor R1b is greater than that of the second divider resistor R2a. A resistance value of the first divider resistor R1a is smaller than that of the second divider resistor R2b.

When the first input unit 20a and the second input unit 30a are interchangeably respectively disposed on the first joint portion 11 and the second joint portion 12 (as shown in FIG. 3), the first input unit 20a and the second input unit 30a are electrically connected to the processing unit 13, and the main resistor Rx, the first divider resistor R1a and the second divider resistor R2a are in series to correspondingly generate a first divided voltage to the processing unit 13 such that the processing unit 13 can determine the current operation mode to be a normal mode according to the first divided voltage. In the normal mode, the mouse button setting may not be changed.

When the first input unit 20b and the second input unit 30a are interchangeably respectively disposed on the first joint portion 11 and the second joint portion 12 (as shown in FIG. 5), the first input unit 20b and the second input unit 30a are electrically connected to the processing unit 13, and the main resistor Rx, the first divider resistor R1b and the second divider resistor R2a are in series to correspondingly generate a second divided voltage to the processing unit 13 such that the processing unit 13 can determine the current operation mode to be a right-handed mode according to the second divided voltage. In the right-handed mode, the mouse button setting is changed to suit the needs of right-handed people.

When the first input unit 20a and the second input unit 30b are interchangeably respectively disposed on the first joint portion 11 and the second joint portion 12 (as shown in FIG. 7), the first input unit 20a and the second input unit 30b are electrically connected to the processing unit 13, and the main resistor Rx, the first divider resistor R1a and the second divider resistor R2b are in series to correspondingly generate a third divided voltage to the processing unit 13 such that the processing unit 13 can determine the current operation mode to be a left-handed mode according to the third divided voltage. In the left-handed mode, the mouse button setting is changed to suit the needs of left-handed people.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A computer mouse having interchangeable modules adaptable to left/right hand use, comprising:
    a mouse body including a first joint portion and a second joint portion, wherein the first joint portion and the second joint are symmetrically arranged with respect to one another;
    a first input unit including a first base and a first button disposed on the first base, wherein the first base and the first button are arc-shaped, and the first button is configured to be depressed downwardly relative to the first base; and
    a second input unit including a second base and a second button disposed on the second base, wherein the second base and the second button are arc-shaped, and the second button is configured to be depressed downwardly relative to the second base;
    wherein a shape of the first base is corresponding to that of the first joint portion and a shape of the second base is corresponding to that of the second joint portion such that the first input unit and the second input unit are interchangeably respectively disposed on the first joint portion and the second joint portion;
    wherein the mouse body includes a processing unit disposed therein, the processing unit has a main resistor, the first input unit has a first divider resistor, and the second input unit has a second divider resistor;
    wherein, when the first input unit and the second input unit are interchangeably respectively disposed on the first joint portion and the second joint portion, the first input unit and the second input unit are electrically connected to the processing unit, and the main resistor, the first divider resistor and the second divider resistor are in series to correspondingly generate a divided voltage to the processing unit such that the processing unit determines a current operation mode to be a right-handed mode, a left-handed mode, or a normal mode according to the divided voltage;
    wherein the processing unit determines the current operation mode to be the normal mode when the divided voltage is a first divided voltage;
    wherein the processing unit determines the current operation mode to be the right-handed mode when the divided voltage is a second divided voltage; and
    wherein the processing unit determines the current operation mode to be the left-handed mode when the divided voltage is a third divided voltage.

2. The computer mouse according to claim 1, wherein the first input unit and the second input unit are symmetrically arranged with respect to one another.

3. The computer mouse according to claim 2, wherein the first input unit and the second input unit are symmetrically respectively disposed on the first joint portion and the second joint portion relative to a central axis of the mouse body.

4. The computer mouse according to claim 3, wherein resistance values of the first divider resistor and the second divider resistor are the same.

5. The computer mouse according to claim 4, wherein one end of the first button has a first pressing section, one end of the second button has a second pressing section, an inner edge of the first pressing section and an inner edge of the second pressing section cooperatively define a gap there-between, the first pressing section has a first curved surface curved downwardly from the inner edge of the first pressing section to an outer edge of the first pressing section, and the second pressing section has a second curved surface curved downwardly from the inner edge of the second pressing section to an outer edge of the second pressing section such that the first curved surface and the second curved surface are configured to be symmetrically curved with respect to one another.

6. The computer mouse according to claim 1, wherein the first input unit and the second input unit are asymmetrically arranged with respect to one another.

7. The computer mouse according to claim 6, wherein the first input unit and the second input unit are asymmetrically respectively disposed on the first joint portion and the second joint portion relative to a central axis of the mouse body.

8. The computer mouse according to claim 7, wherein a resistance value of the first divider resistor is greater than that of the second divider resistor.

9. The computer mouse according to claim 8, wherein one end of the first button has a first pressing section, one end of the second button has a second pressing section, an inner edge of the first pressing section and an inner edge of the second pressing section cooperatively define a gap there-between, the first pressing section has a first curved surface curved upwardly from the inner edge of the first pressing section to an outer edge of the first pressing section, and the second pressing section has a second curved surface curved downwardly from the inner edge of the second pressing section to an outer edge of the second pressing section such that the first curved surface and the second curved surface are configured to be asymmetrically arranged with respect to one another.

10. The computer mouse according to claim 7, wherein a resistance value of the first divider resistor is smaller than that of the second divider resistor.

11. The computer mouse according to claim 10, wherein one end of the first button has a first pressing section, one end of the second button has a second pressing section, an inner edge of the first pressing section and an inner edge of the second pressing section cooperatively define a gap there-between, the first pressing section has a first curved surface curved downwardly from the inner edge of the first pressing section to an outer edge of the first pressing section, and the second pressing section has a second curved surface curved upwardly from the inner edge of the second pressing section to an outer edge of the second pressing section such that the first curved surface and the second curved surface are configured to be asymmetrically arranged with respect to one another.

* * * * *

UNITED STATES PATENT AND TRADEMARK OFFICE
CERTIFICATE OF CORRECTION

PATENT NO. : 10,331,234 B2  
APPLICATION NO. : 16/265381  
DATED : June 25, 2019  
INVENTOR(S) : Ho-Lung Lu et al.

Page 1 of 1

It is certified that error appears in the above-identified patent and that said Letters Patent is hereby corrected as shown below:

On the Title Page

Item [73], should read:  
DEXIN ELECTRONIC LTD.  
Dongguan, Guangdong (CN);  
DEXIN CORPORATION  
New Taipei (TW)

Signed and Sealed this  
Twelfth Day of November, 2019

Andrei Iancu  
*Director of the United States Patent and Trademark Office*